United States Patent [19]
Gerard et al.

[11] Patent Number: 5,769,576
[45] Date of Patent: Jun. 23, 1998

[54] DEVICE FOR POSITIONING A MACHINING SPINDLE USING ITS PILOT ROD

[75] Inventors: Daniel Gerard, Annemasse; Fernand Tenand, Annecy Le Vieux, both of France

[73] Assignee: Machines Serdi, Annecy, France

[21] Appl. No.: 662,135

[22] Filed: Jun. 12, 1996

[30] Foreign Application Priority Data

Jun. 13, 1995 [FR] France .................................. 95 07253

[51] Int. Cl.$^6$ .................................................. B23B 41/00
[52] U.S. Cl. ........................... 408/83.5; 408/88; 408/236; 408/237
[58] Field of Search ................. 408/75, 80, 81, 408/83.5, 88, 236, 237, 709

[56] References Cited

U.S. PATENT DOCUMENTS

| | | | |
|---|---|---|---|
| 3,522,758 | 8/1970 | Mineli et al. ........................... | 408/83.5 |
| 3,764,204 | 10/1973 | Kammeraad ............................. | 408/709 |
| 4,332,066 | 6/1982 | Hailey et al. . | |
| 4,613,262 | 9/1986 | Woods .................................... | 408/236 |
| 4,899,458 | 2/1990 | Minelli .................................... | 408/708 |
| 4,999,896 | 3/1991 | Mangus et al. .......................... | 408/236 |
| 5,017,062 | 5/1991 | Leroux et al. .......................... | 408/83.5 |
| 5,302,057 | 4/1994 | Siegfried ................................. | 408/83.5 |
| 5,613,809 | 3/1997 | Harmand et al. ....................... | 408/83.5 |

FOREIGN PATENT DOCUMENTS

| | | |
|---|---|---|
| 0 263 766 | 4/1988 | European Pat. Off. . |
| 0 478 478 | 4/1992 | European Pat. Off. . |
| 2 501 094 | 9/1982 | France . |
| WO 80/01365 | 7/1980 | WIPO . |

*Primary Examiner*—Daniel W. Howell
*Attorney, Agent, or Firm*—Oliff & Berridge, PLC

[57] ABSTRACT

The means for aligning this device comprise a sphere holder (17) placed on a support (4) with the possibility, in the phase of positioning the spindle (6), of it shifting in all directions of the horizontal plane, a spherical core (13) mounted in the sphere holder (17) with the possibility of rotating freely, a substantially vertical sheath (10) which can be shifted axially in the core (13) and carries the spindle for driving the tool. The spherical core (13) carries masses which, balancing the mass of the means for driving the sheath (10) in translation and the mass of this sheath and of the spindle when these are in the lowered alignment position, bring the centre of gravity (G) of the assembly substantially onto the axis (x,x') of the sheath (10), while the electric means (28,29) for powering the spindle (6) are arranged in the sheath (10) and in such a manner that when this sheath is in the lowered alignment position, the centre of gravity of this sheath is on the axis (x',x) and close to the centre (C) of the spherical core (13), that the means for generating the flat cushion between the support (4) and the sphere holder (17) comprise nozzles (47) arranged in the support (4) facing the sphere holder (17) and able to deliver a film of uniform thickness and that the clamping means comprise tubes (62) distinct from the lift nozzles (47) and able to be connected to a source of vacuum.

21 Claims, 7 Drawing Sheets

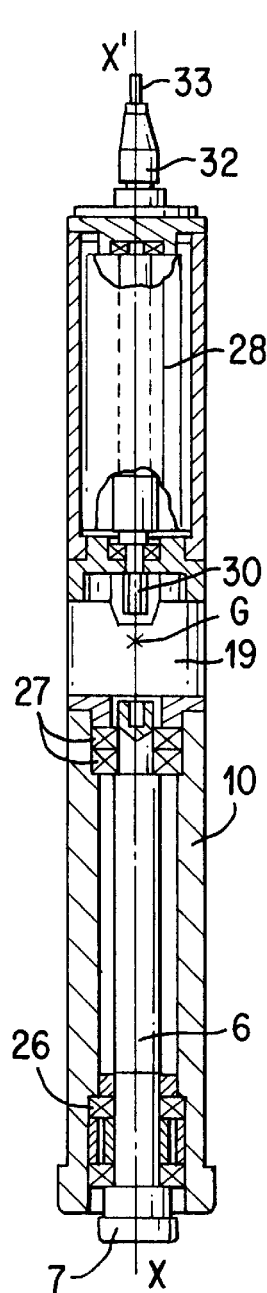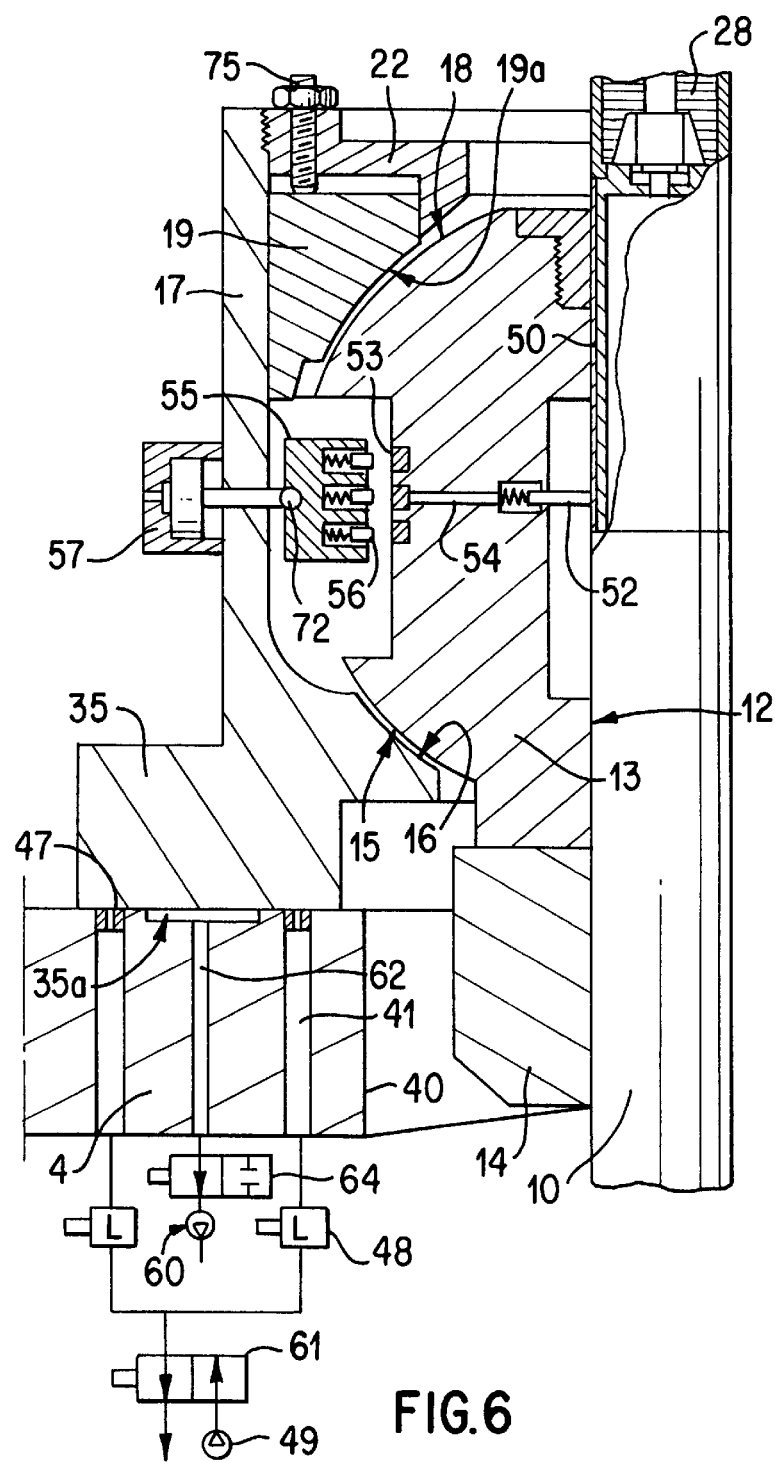
FIG. 5
FIG. 6

DEVICE FOR POSITIONING A MACHINING SPINDLE USING ITS PILOT ROD

BACKGROUND OF THE INVENTION

The invention relates to a device for aligning the longitudinal axis of a machining tool with respect to the bore of a valve guide with a view to the precision-machining of the seat or any other bearing surface concentric with this bore.

It relates more specifically to devices comprising, on the one hand, a pilot rod for positioning, borne, together with the machining tool, by a spindle connected to means able to drive it in rotation and which is mounted so that it can rotate freely in a sheath which can be shifted axially and, on the other hand, a pre-adjustment support which can be shifted in the horizontal plane with respect to the slideways of a bed and in at least one longitudinal direction, or in two perpendicular directions and, in addition and between the sheath and the pre-adjustment support, a means for the angular orientation of the spindle with respect to the vertical, this means being composed of a spherical core through which the sheath passes, resting on the lower spherical seat of a sphere holder and interacting with a means for holding something firmly in the position for machining.

With this type of device, the alignment operation comprises:

- a pre-adjustment phase consisting in bringing the device above the seat, by shifting the pre-adjustment support on the bed,
- a phase of releasing the means for locking or clamping the elements of the device,
- a phase of lowering the sheath, with respect to the core, using motorized or manually-operated drive means with the pilot rod being guided manually, in order to facilitate the insertion of the pilot into the valve guide,
- a phase of alignment, taking place automatically using the rigidity of the rod between the pilot and the tool to bring the axis of the spindle into coincidence with the axis of the guide, by relative shifting of the elements of the alignment device,
- then finally, a phase of locking in position.

Depending on the embodiment, the spherical core is associated with pneumatic support means, as in WO-A-80/01365, with electromagnetic support means, as in EP-A-263766, or, more simply, rests on a layer of material with a high coefficient of slip covering the spherical seat supporting it, and this is so that after its means for holding it firmly in position have been released, it can pivot freely in this seat to allow the sheath and therefore the longitudinal axis of the spindle to be orientated.

In the case of devices mounted on machines for grinding valve seats requiring a high driving torque, an electric motor, fixed to the pre-adjustment support, is connected to the spindle by transmission means which, even if it comprises an intermediate telescopic shaft with a Cardan joint at each end for following the angular movements involved in orientating the spindle, as in FR-A-2501094, impedes these movements and requires a substantial force, which does not favour accuracy of the sought position, at the time of automatic alignment.

To this should be added the fact that when the pilot is inserted into the bore of the valve guide, and when the pilot rod, through its rigidity, adjusts the position of the spindle, orientating it angularly and shifting it in the horizontal plane, this shifting takes place in an arbitrary direction with respect to the spindle, and requires all of the members and means borne by the device to be shifted. For top-of-the-range machines, the mass to be shifted is of the order of 140 kilograms. Owing to the inertia of this mass and to the friction between the guide means giving the crossed motion, this friction being amplified by the breakdown of forces when the shifts of the spindle are not parallel to the crossed motion, these shifts of the pilot rod are not perfect, which means that the reaction force developed by the pilot rod is countered and that the rod may remain deflected and not bring the axis of the spindle into coincidence with that of the guide. The result of this is that it leads to concentricity inaccuracies which may be as much as a few hundredths of a millimetre, which is thus inacceptable.

These drawbacks are all the more troublesome when a machine of this type is used to grind the valve seats of multi-valve cylinder heads, for example ones having four valves per cylinder, which have valve guides of a diameter smaller than or equal to 7 mm, because the pilot rod, which has a diameter of the order of 4 mm, is more flexible and more able to retain residual stresses with the risk of having a permanent deformation or when, as in EP-A-478478, the device for positioning the pilot rod is combined with means making it possible, by feeling, to determine the mean geometric position of the longitudinal axis of the housing for the valve.

Indeed, in these cases, and despite the freedom of movement given to the spherical core, the inertias and various resistances to shifting in the horizontal plane disrupt, respectively, the alignment of the spindle or the movements of feeling the ovalized internal face of the reference bore.

FR-A-2501094 discloses an alignment device in which the spherical articulation is borne by an adjustment body which, in the alignment phase, can slide in a horizontal plane with respect to a fixed clamp containing it and which, after alignment, is locked by actuator rods.

Such a device does away with the reactions resulting from the break-down of forces by the movements of the crossed slides, but adds friction which, adding to the stresses exerted on the spindle by the Cardan joint connecting it to its drive means, generate alignment inaccuracies which do not allow this device to be used for machining multi-valve cylinder head valve seats.

Furthermore, after alignment, actuation of the means for locking the adjustment body may shift this body not parallel to itself thus, as shown in FIG. 8, causing it to rest on the support off-centred with respect to the axis of the spindle and causing a flexing of the spindle, by the latter tilting about its pilot set in the valve guide. An inaccuracy at the time of locking is hence added to the inaccuracy in automatic alignment.

These various drawbacks are worsened in the alignment devices in which the sphere holder is supported by a flat cushion of air in the alignment phase.

This is because it has proved that, during the alignment phase, the various masses of the device and particularly those of the means for driving the rotation of the spindle, but also and above all those for driving the translation of this spindle, create tilting movements on the spindle/sphere/sphere holder assembly, which tend to give the flat cushion a wedge shape causing the sphere holder to tilt in the clamping phase. The result of this, as shown in FIG. 8, is that the axis of the spindle becomes misaligned with respect to the position defined in the alignment phase, which finally leads to inaccuracies.

SUMMARY OF THE INVENTION

The object of the present invention is to provide an alignment device which overcomes these drawbacks by reducing the inertia and eliminating most of the physical and mechanical stresses which result from the transmission of the movement for driving the spindle and from the guiding of the translational movement of this spindle in its sphere with respect to the sphere holder and with respect to the support.

To this end, in the device according to the invention, the spherical core carries masses which, balancing the mass of the means for driving the sheath in translation and the mass of this sheath and of the spindle when these are in the lowered alignment position, bring the centre of gravity of the assembly substantially onto the axis of the sheath, while the electric means for powering the spindle are arranged in the sheath and in such a manner that when this sheath is in the lowered alignment position, the centre of gravity of this sheath is on the axis and close to the centre of the spherical core, that the means for generating the flat cushion between the support and the sphere holder comprise nozzles arranged in the support facing the sphere holder and able to deliver a film of uniform thickness and that the clamping means comprise tubes distinct from the lift nozzles and able to be connected to a source of vacuum.

By virtue of this arrangement, when the means for holding the core firmly release this core to allow the spindle to be aligned with the valve guide, the angular orientation of the spindle is no longer hampered by a mechanical transmission creating a directional force. What is more, doing away with this mechanical transmission considerably reduces the value of the mass to be shifted and reduces the inertia. In addition, the organization of the masses in the sheath, the balancing of the masses of the whole assembly, the positioning of the centre of gravity on the axis of the sheath then at the centre of the core, and the supporting of the sphere holder using a uniform film of air, eliminate all the external stresses so that the sphere holder is completely free to shift in the horizontal plane and generates no stresses at the time of automatic alignment of the spindle, by reaction to the pilot fitting into the guide.

Likewise, this arrangement favours the shifting of the device and does away with all parasitic stresses during the operation of the pilot feeling for a bore.

Finally, the balancing of the sheath/sphere/sphere holder assembly, combined with the production of a flat film of uniform thickness, guarantees parallelism between the lower face of the sphere holder and the upper one of the support and, at the time of clamping by partial vacuum, avoids any inclination of the sphere holder and therefore any change in the accurate alignment achieved in the previous phase.

It is thus clear that the positioning of the centre of gravity of the head, the layout of the means for powering the spindle motor, the formation of a flat support film of constant thickness, and the vacuum clamping work together towards a common goal which is that of obtaining perfect alignment of the spindle with the valve guide.

In one embodiment of the invention, the unlocking travel of the piston which locks the spherical core by interaction with the lower spherical seat of the sphere holder is limited by three adjustable stops screwed into a fixed wall of the sphere holder at 120° from one another.

Thus, in the alignment phase, the cushion of air which is formed between the lower spherical seat and the spherical core is sized by the cushion formed between the core and the upper seat, because this seat is itself perfectly positioned by the resting of the back of the locking piston on the three stops. The result of this is that any transverse shift of the spherical core is prevented and that the alignment operation gains in accuracy.

In one embodiment of the invention, the electric motor arranged in the sheath is powered by means of an external circuit including a retractable wiper interacting with contact members borne by the core on either side of its diametral plane, and forming part of a circuit internal to the core.

Thus, in the alignment or feeling phase, the wiper is brought into a retracted position to leave the spherical core completely free to move. The result of this is that this core is freed of all the stresses, even minimal ones, resulting from the means for powering the electric motor of the spindle. After positioning, the wiper is brought into the operating position, that is to say is shifted radially towards the core in order to power the electric motor.

Advantageously, each of the nozzles formed in the support for forming the film of air supporting the sphere holder includes, on its compressed-air supply circuit, a member for adjusting its flow.

This arrangement makes it possible, in a simple way, to adjust the delivery of the various nozzles in order to obtain a film of air of constant thickness guaranteeing, between the alignment phase and the locking phase, and by virtue of the centre of gravity of the head being positioned in the bore thereof, that the sphere holder drops down parallel to the support.

BRIEF DESCRIPTION OF THE DRAWINGS

Further features and advantages will emerge from the description which follows with reference to the attached diagrammatic drawings representing, by way of example, several embodiments of the device according to the invention.

FIG. 5 is a view in longitudinal section of one embodiment of the sheath containing the motorized spindle.

FIG. 6 is a partial view in section, showing, on a larger scale, an alternative form of the means for powering the spindle motor.

DESCRIPTION OF PREFERRED EMBODIMENTS

Figure 1:
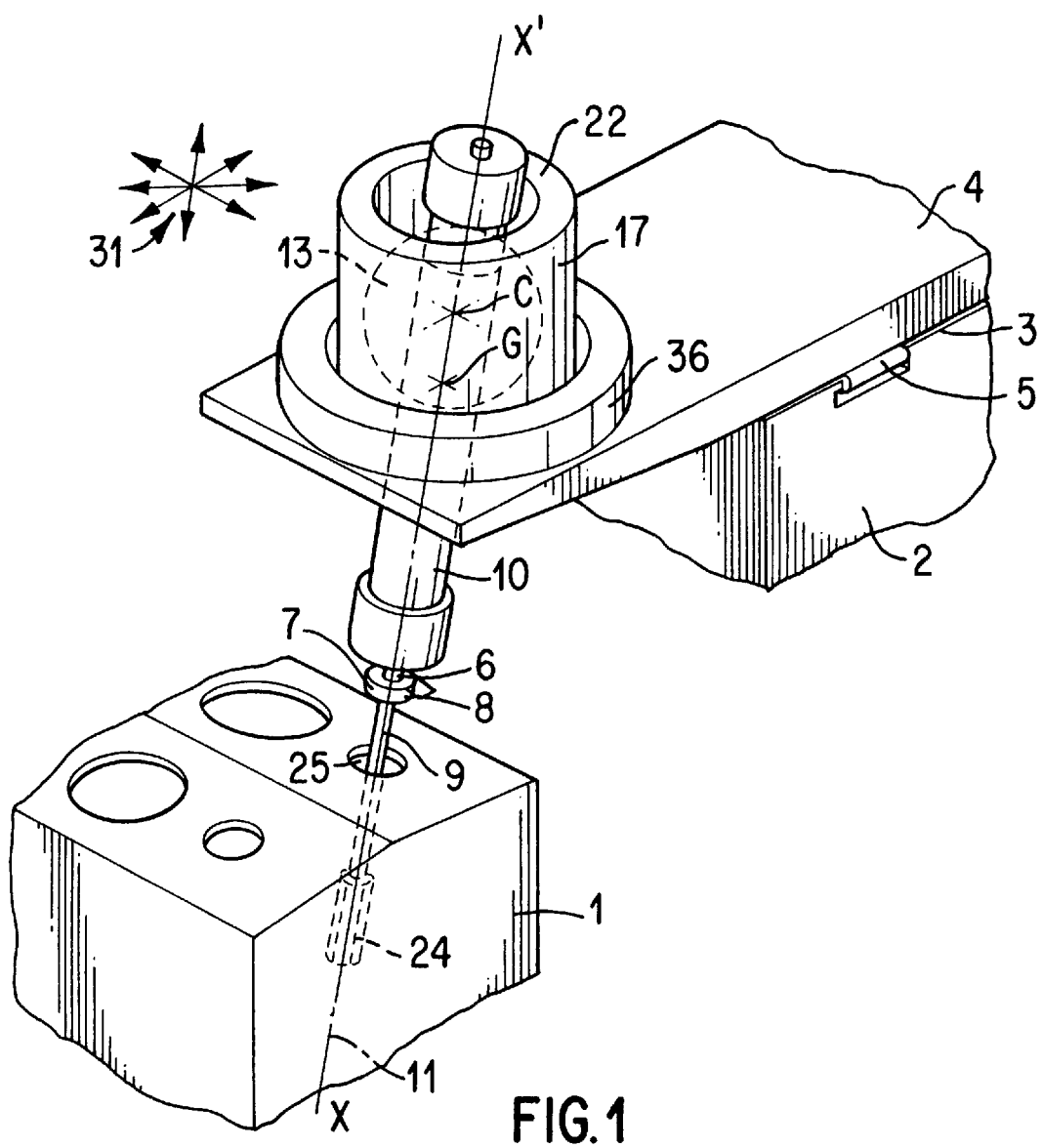
FIG. 1 is a partial view in perspective diagrammatically showing a tool-holder device according to the invention in the positioning phase.

In this drawing, the numerical reference 1 denotes a cylinder head (FIG. 1), and the reference 2 denotes, in general, the bed of the machine provided with longitudinal slideways 3 for a pre-adjustment support 4, which is guided by rolling elements 5. The spindle 6 is provided with a tool holder 7, in which a tool 8 can be engaged with its pilot rod 9. This spindle is mounted so that it can rotate freely in a sheath 10. The latter is held firmly against rotation and mounted so that it can slide in the internal bore 12 of a spherical core 13, with the possibility of shifting, under the control of a device of the motorized or mechanical type. In FIG. 2, this device consists of a gearwheel 11*a* driven by a handwheel 11*b* and interacting with a rack 11*c* formed on the sheath 10. The translational guidance of the sheath 10 is supplemented by a lower bearing 14 secured to the spherical core 13 and through which the shaft lid connecting the handwheel 11*b* to the gearwheel 11*a* passes.

The reference 73 denotes a gas strut for balancing which, interposed between the spherical core 13 and a support 74 connected to the sheath 10, has the objective of storing up energy as the sheath is lowered, in order to restore it as it rises again, and also of holding the sheath in position when the handwheel 11*b* is not actuated.

The spherical core 13 is held firmly against rotation about the axis of the sheath 10 by means which have not been represented and includes a lower spherical bearing surface 15 which rests on a seat 16 in the shape of a spherical cup secured to a sphere holder 17 borne by the support 4. An upper spherical bearing surface 18 of the core 13 is intended to interact with the corresponding concave bearing surface of a holding means here consisting of a piston 19 which can be shifted vertically in the sphere holder 17. In the embodiments represented, the piston 19 is shifted in the direction of clamping the spherical core 13 by a compressed air circuit, the air reaching the chamber 20 formed between the upper face of this piston and a fixed annular wall 22 of the sphere holder 17.

The means represented here correspond to those described in International Application WO-A-80/1365 and need not be described further in detail. It should, however, be pointed out that when the device is in the alignment-adjustment or feeling position, the chamber 20 is vented to atmosphere in order to free the piston 19 and compressed air is introduced via a duct 21 into the central chamber 23 formed between the core 13 and the body 17 in order, on the one hand, to support the core vertically and, on the other hand, to form two cushions of air between the spherical bearing surfaces 15 and 18 of this core and, respectively, the seat 16 and the piston 19.

Figure 2:
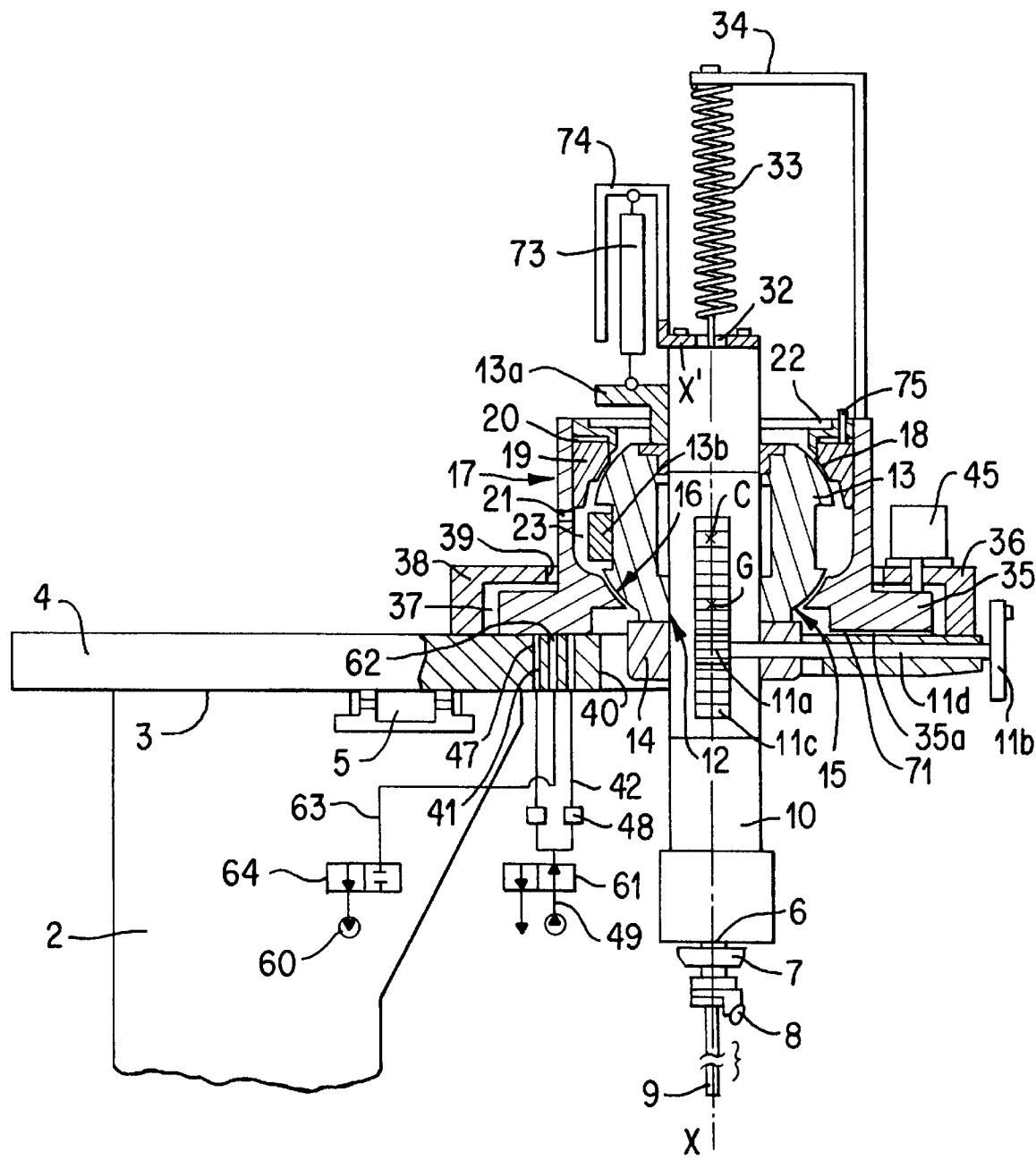
FIG. 2 is a side view in transverse section showing one embodiment of the device when it is equipped with a handwheel for shifting the sheath.
Figure 3:
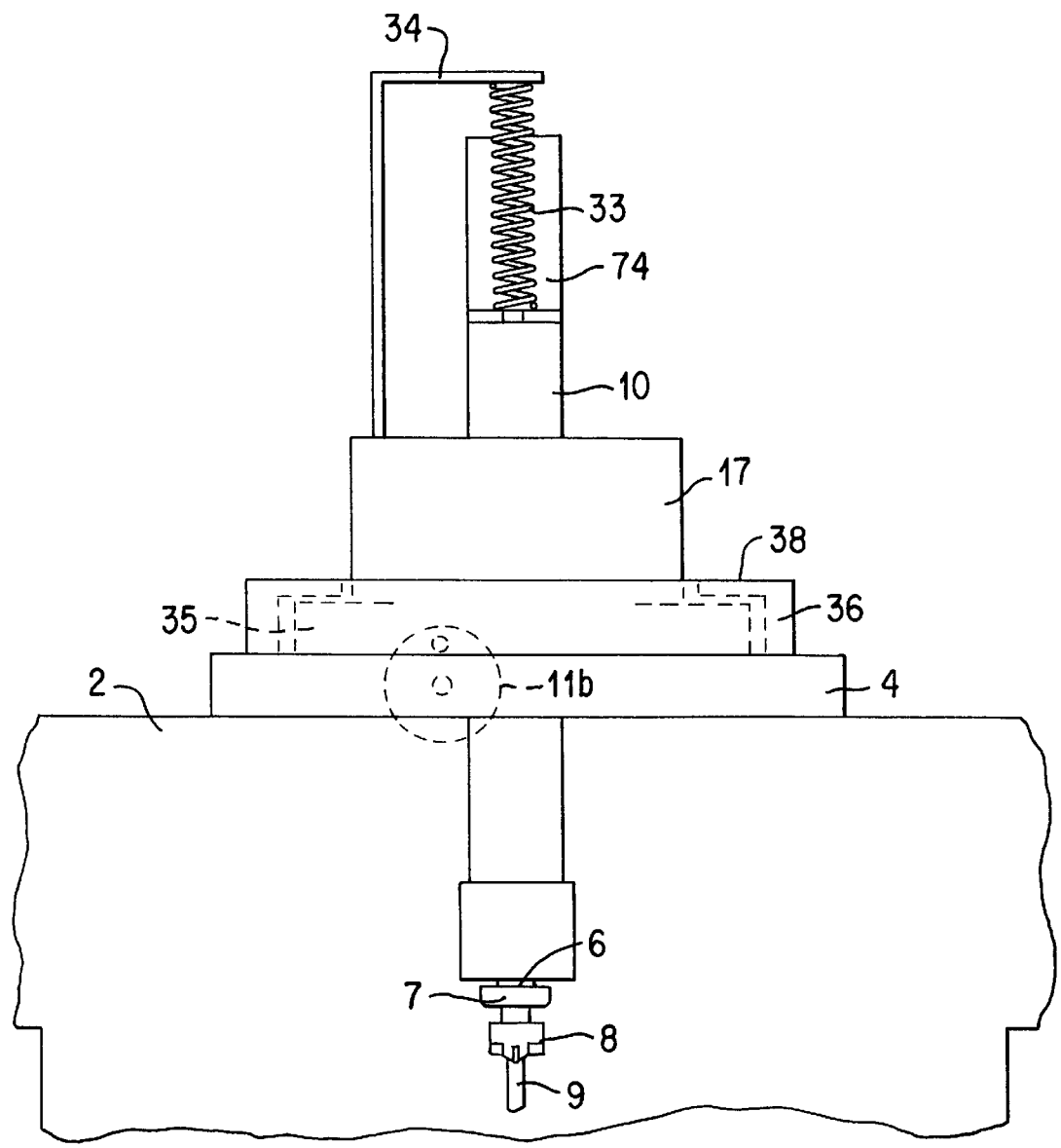
FIG. 3 is a front elevation of the device represented in FIG. 2.

The assembly which has just been described constitutes a means for angularly orientating the core 13 and the spindle 6 making it possible, as shown in FIG. 1, to align the axis x'x of the spindle with the longitudinal axis of a valve guide 24 coaxial with the valve seat 25 which is to be re-machined, in which guide the pilot 9 is set.

As shown in greater detail in FIG. 5, the sheath 10 containing bearings 26 and 27 for guiding the rotation of the spindle 6 also constitutes a housing for an electric motor 28 and for the means 29 transmitting the movement between its output shaft 30 and the end of the spindle 6. In the embodiment represented, the means 29 consist of a reduction gear, but they may adopt any other form, without departing from the scope of the invention.

As a result of this, the centre of gravity G of the head formed by the sheath and the elements which it contains, which terminate there and which it bears, is arranged on the axis x'x of the spindle 6.

What is more, and according to another feature of the invention, the spherical core 13 bears masses 13*a* and 13*b* which balance the mass of the means 11*a* to lid for driving the translation of the sheath 10, and also the mass of this sheath 10 and of the spindle 6 when the latter two elements are in the alignment position, that is to say lowered. This balancing is intended to bring the centre of gravity of this assembly onto the axis x'x of the sheath 10 and to eliminate the parasitic torque at the time of shifting of the spindle in the alignment phase. What is more, these various elements are arranged with respect to one another in such a way that when the sheath is in the alignment position, that is to say is lowered to allow the pilot 9 to be inserted into the valve guide 24, the centre of gravity G is close to the centre C of the spherical core 13, as shown in FIG. 1.

In FIGS. 2 to 5, the electric motor 28 is powered by an axial connector 32 terminating a flex 33 which is wound into a helix, and the upper end of which is fastened to a bracket 34 secured to the sphere holder 17. By virtue of this arrangement, the flex exerts a very small stress on the machining head, this stress being incapable of hampering the various movements during the alignment phase.

FIG. 2 clearly shows that by virtue of this particular layout, the head of the machine is not encumbered with any transmission devices and that as a result of this the angular orientation of the spindle 6 is freed of all the stresses inherent to such a transmission. The same is true of the shifting movements in the horizontal plane, which movements, unencumbered by the inertia of the motor and of the intermediate transmission, take place without a substantial initiating force, and then take place very freely.

The sphere holder 17, which has a cylindrical overall shape, is secured to a cylindrical flange 35, the lower face 35*a* of which rests directly on the upper face of the preadjustment support 4. It may be used on its own or be arranged in a cylindrical casing 36 fixed to the support 4 and including an interior bore 37 having a larger diameter than the outside diameter of the flange 35, so as to leave a radial clearance with this flange. Likewise, the upper wall 38 of the casing is some distance from the upper face of the flange 35, so as to allow the latter to shift freely. This upper wall has an axial opening 39, the diameter of which is larger than the outside diameter of the cylindrical body 17, and the support 4 has an opening 40 of larger diameter than the outside diameter of the lower bearing 14 secured to the core 13 passing through it.

It will be readily understood that by virtue of this structure, the sphere holder 17, and therefore the. core 13, the sheath 10, and the spindle 6, can be shifted radially in all directions starting from the longitudinal axis of the body, as shown by the arrows 31 in FIG. 1, and also in translation on either side of the theoretical longitudinal axis of the casing 36, and that this is true within the limits permitted by the radial clearance between the flange 35 and the internal bore 37 of the casing 36.

This arrangement does away with all the drawbacks inherent to the use of crossed-motion slides, or slides with other motions having one direction fixed by constraint of mechanical nature and makes it possible, in the case of a machine for machining valve seats, to use the movements of the support 4 only for prepositioning the head with respect to the area of work on the cylinder head 1 (FIG. 1).

In order to facilitate this movement, and as shown in FIG. 2, that region of the support 4 which lies beneath the casing 36 and more particularly underneath the region in which the flange 35 shifts, has, passing through it, ducts 41 connected to a circuit 42 of pressurized gas 49, especially compressed air, controlled by directional control valves 61. In these conditions, supplying the ducts 41 with pressurized air creates a film 71 of air between the flange 35 and the support 4, this film supporting the sphere holder 17 and all the members it contains, and making it easier for this body to shift with respect to the support 4.

This arrangement reduces friction and, in combination with the two cushions of air favouring orientation of the spherical core 13 allows, in the alignment phase, the head to be freed of any stress and, at the time of feeling, allows the feeler assembly to be freed of any force, making this operation easier.

It is emphasized that the readings taken during the feeling operation are recorded by mechanical or electronic means which have not been described here because they have nothing to do with the subject-matter of the invention.

Advantageously, and as shown in FIG. 6, passing through the fixed annular wall 22 of the sphere holder 17 are three screws 75 parallel to the axis x'x, spaced 120° apart and constituting stops for the piston 19. Thus, when the chamber 20 is vented to atmosphere and compressed air is introduced into the chamber 23, the retreating of the piston 19 brings its back to rest perfectly against the three stops 75 so that it remains perfectly positioned. The same is true for its spherical seat 19a which thus sizes the film of air passing between it and the upper bearing surface 18 of the core 13. This sizing provides self-centring of the spherical core 13 and sizes the film of air passing between its lower bearing surface 15 and the seat 16 of the sphere holder. This arrangement avoids any off-centring of the spherical core 13 which may influence the accuracy of the alignment operation and subsequently the accuracy of the clamping.

When the alignment or feeling operation is over, and the position of the spindle is definitive, it is locked in position. The spherical core is held firmly by pneumatic shifting of the piston 19 then the sphere holder 17 is clamped.

Figure 8:
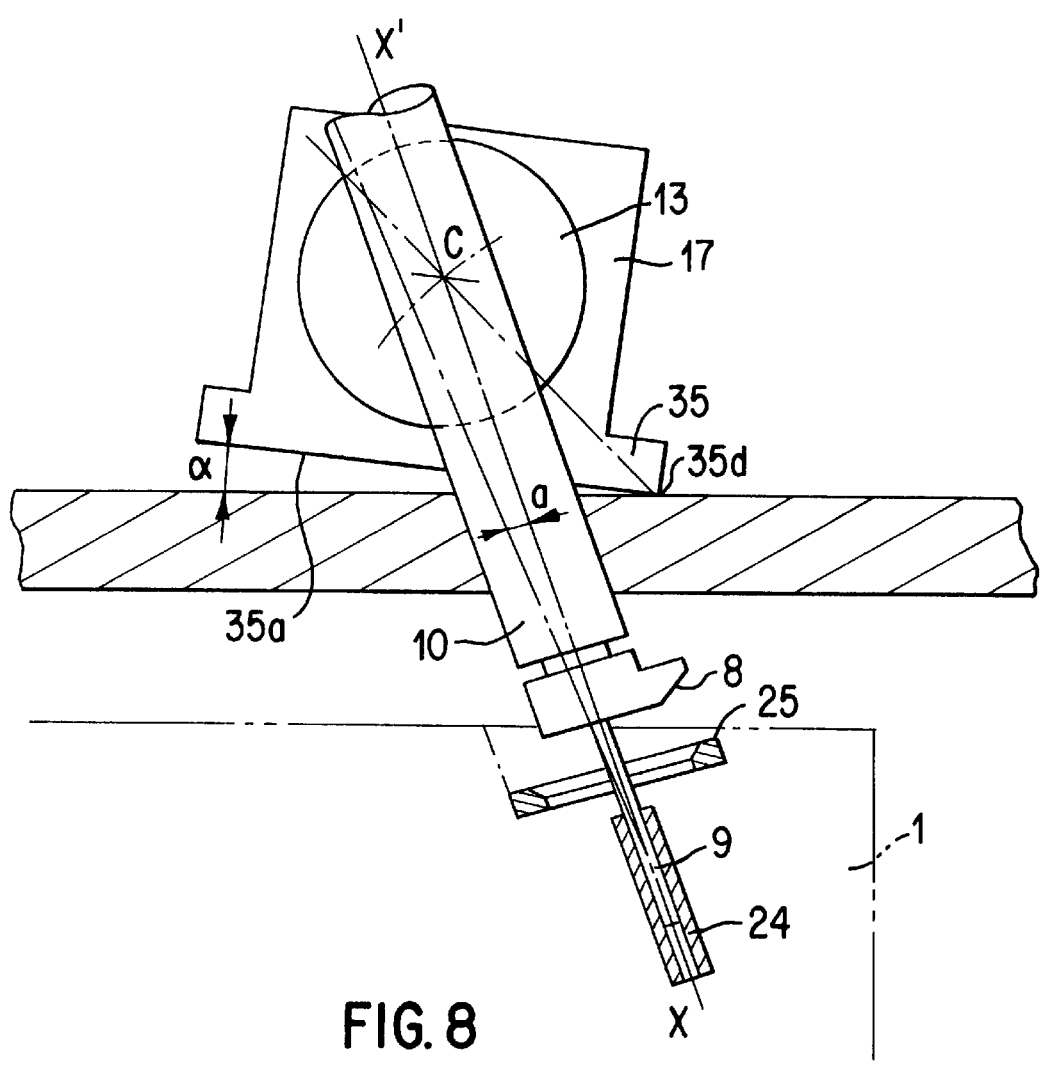
FIG. 8 is a diagrammatic side view illustrating, on a very much larger scale, the error in alignment which results from mechanical clamping acting on a support film of uneven thickness.

In order to prevent the flange 35 coming to rest on the support 4 at 35d, that is to say with eccentricity, during this clamping operation, as shown in FIG. 8, causing the sphere holder 17 to tilt off centre and the axis x'x of the spindle 6 to tilt about the point where the pilot 9 is set in the guide 24, at an angle a, and consequently disturbing the setting of this axis with respect to its position defined by the operation of alignment with the axis of the guide, means are provided for forming a film of air of constant thickness between the support 4 and the sphere holder 17, and other means organize the removal of this film.

The means which give the film of air a constant thickness consist of nozzles 47 which, arranged at the outlet of the ducts 41 are each associated with a member 48 for adjusting their delivery, as FIG. 6 shows. It is by virtue of the positioning of the centre of gravity on the axis x'x of the assembly comprising the sphere holder, the spherical core and the sheath, and of the setting of the nozzles that it is possible to obtain a flat film 71 of air of uniform thickness and to obtain, during clamping, a shifting of the sphere holder parallel to itself.

The means which organize the removal of the film 71 of air and therefore of the clamping consist, as shown in FIG. 2 and 6, of ducts with tubes 62 which, distinct from the ducts 41 with nozzles 47, are connected by pipes 63 to a directional control valve 64 which can either isolate them or place them in communication with a source of vacuum 60.

With this arrangement, when the alignment operation is over, the manually or electromagnetically controlled directional control valve 61 is actuated in order to cut off the compressed air supply 49 and place the film 71 of air in communication with the atmosphere 59. Owing to the even thickness of the film and its small thickness, of the order of a few hundredths of a millimetre, the sphere holder 17 drops down parallel to itself, following the axis of the spindle, by virtue of the guidance provided by the sliding of the pilot 9 in the valve guide 24. As soon as the sphere holder 17 is resting on the support 4, the directional control valve 64 is actuated and places the ducts 41 with tubes 62 in communication with the source of vacuum 60 in order to create a partial vacuum for locking the sphere holder 17 on the support 4 and clamping the position obtained.

This clamping is generally sufficient to withstand the cutting forces generally encountered. It may, however, be supplemented by mechanical clamping.

Figure 4:
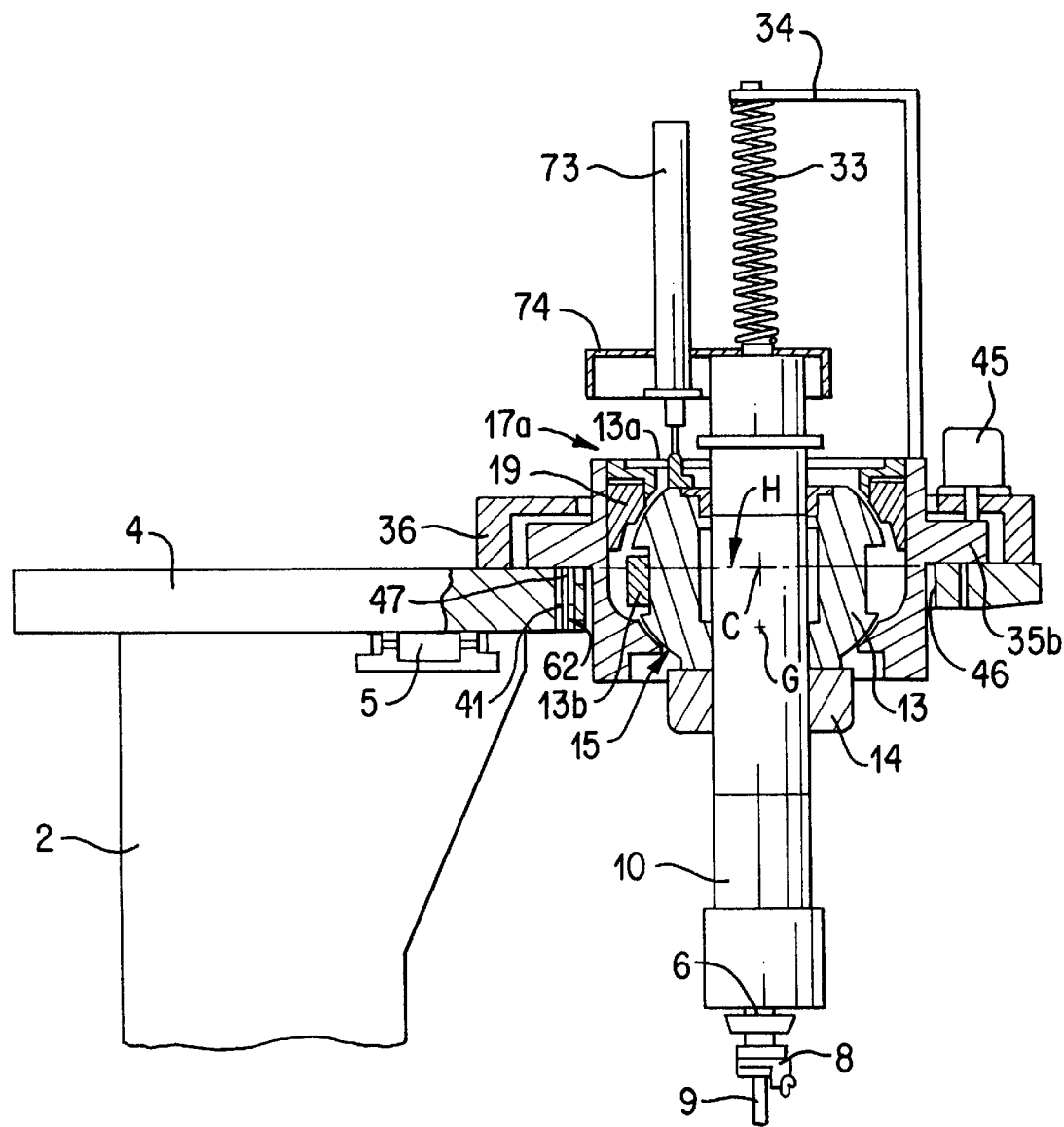
FIG. 4 is a side view in section of another embodiment of the device.

In FIGS. 2 and 4 the mechanical clamping means consist of several pneumatic actuators 45 distributed around the sphere holder 17, and the bodies of which are fixed to the upper face 38 of the casing 36, while their rod passes through this wall 38 to come into contact with the upper face of the said flange.

Figure 7:
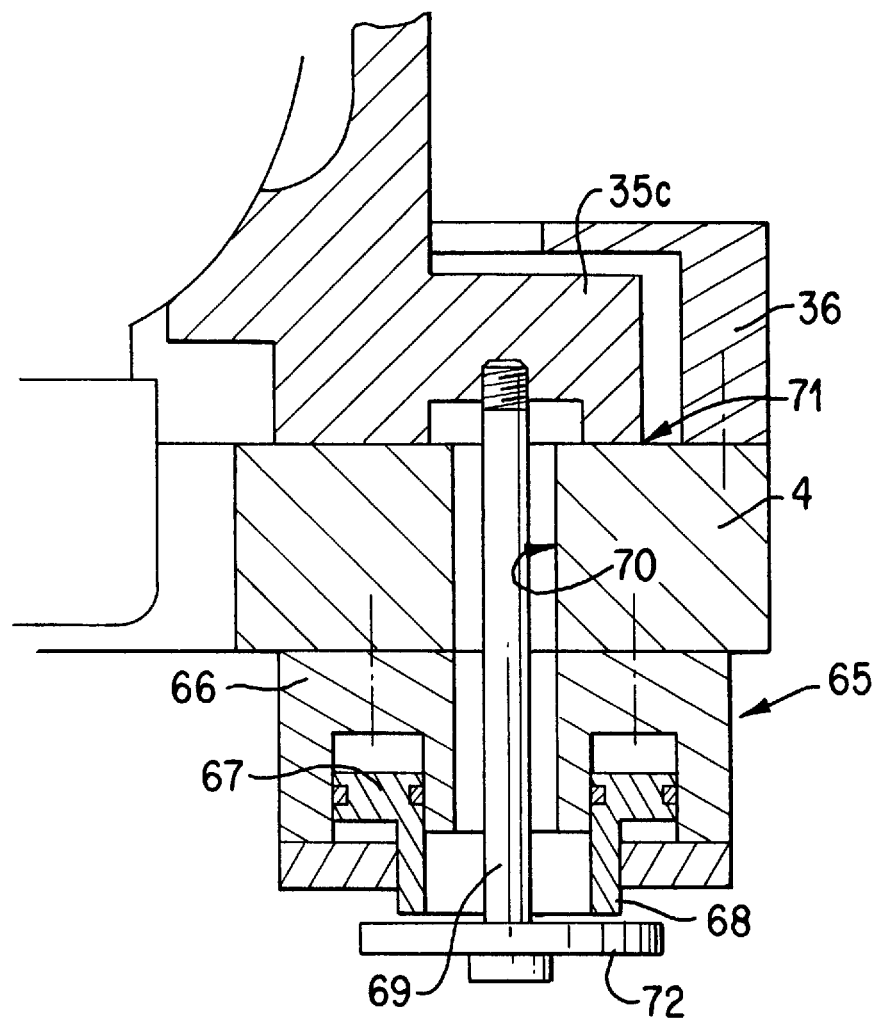
FIG. 7 is a side view in section showing an alternative form of the clamping means.

In the alternative form represented in FIG. 7, the actuators 65, for example three of them arranged at 120° about a longitudinal and vertical axis of the casing 36, are arranged below the support 4 against which their bodies 66 are fixed. Their pistons 67 are equipped with a tubular hub 68 through which an axial rod 69 passes. Each rod, the upper end of which is screwed into the flange 35c of the body 17, passes through a bore 70 in the support 4 and the tubular hub 68, with a clearance which corresponds to the clearance for the shifting of the flange 35c inside the casing 36. Finally its lower end protruding beyond the hub is secured to a washer 72 capable of taking the thrust of the hub 68 of the piston 67.

Thus, when the flange 35c is supported by a cushion 71 of air, the clamping actuators 65 do not oppose its shifting and, during clamping, the force of the actuators is transmitted directly via the rods 69 to the flange 35c.

In the embodiment represented in FIG. 4, the device can be differentiated from the previous one in that the centre C of the spherical core 13 is arranged substantially in the horizontal plane H of the upper face of the support 4. The result of this is that the cylindrical body 17a stretches on either side of the flange 35b and, in its lower part, passes through an opening 46 in the support 4.

By virtue of this arrangement, the angular orientation of the spindle is independent of its position in the horizontal plane, which further improves the alignment or feeling conditions.

Finally, in order to do away with the very slight hindrance which may be caused by the flex 33 for powering the electric motor 28, it is possible to replace this type of power supply by the one represented in FIG. 6 which takes place substantially in a horizontal midplane of the spherical core 13. This power supply is composed of an interior circuit comprising:

longitudinal strips 50 made of an electrically-conductive material, lying flush with the exterior face of the sheath 10 and connected electrically to the electric motor supply circuit arranged inside this sheath, contact pads 52 emerging from the axial bore 12 of the core 13 and able to come into contact with the strips 50, and portions of circular strips 53 projecting on the outside of the core, distributed on either side of its horizontal diametral plane and connected electrically to the pads 52 by circuits 54, and an external circuit ending at a contact wiper 55.

This wiper bears sprung contact pads 56, connected electrically to the external supply circuit. The wiper 55 is mounted so that it floats on a means able to shift it between an operating position in which its contacts 56 come into contact with the strips 53, and a retracted position in which its contacts are away from these strips. In the embodiment represented, this means consists of an actuator 57, the body of which is fixed to the exterior part of the sphere holder 17, and the rod of which passes through this sphere holder in order to bear on the wiper via a ball joint 72.

It will be readily understood that in the adjustment phase the wiper 55 is brought into the retracted position in order to release the core 13 completely and that after the position of the tool has been adjusted it is brought into the operating position with its contacts 56 in contact against the strips 53. It is emphasized that owing to the slight angle of angular orientation of the core 13 in the adjustment phase, which angle is of the order of 1° to 5°, the variations in position of the contact faces of the strips 53 are easily compensated for by the fact that the wiper 55 is mounted floating and also by the fact that its contacts are mounted floating and elastically.

It is clear from the foregoing that the device according to the invention, by freeing the means for adjusting the inclination and for adjusting the vertical position of the longitudinal axis of the spindle from any external stresses, does away with jerks, reduces forces, and makes adjustment more accurate because a concentricity of the order of 0.02 mm can be obtained regularly. This device also favours feeling which can become manual.

Moreover, it will be noted that dispensing with the external transmission of the type having a telescopic shaft and two Cardan joints between the motor and the spindle, makes it possible to increase the rotational speed of the spindle to obtain the speeds necessary for machining the seats and guides of valves of small dimensions.

What is calimed is:

1. A device for aligning a longitudinal axis of a rotatable spindle of a machine tool with an axis of a cylindrical aperture, wherein a pilot rod attached to the spindle is used to align the spindle, the device comprising:
   a pre-adjustment support movably mounted on a bed of the machine tool so that the pre-adjustment support is movable in a horizontal plane;
   a sphere holder mounted on the pre-adjustment support;
   a clamp for clamping the sphere holder to the pre-adjustment support;
   a first support for movably supporting the sphere holder on the pre-adjustment support when the clamp is released such that the sphere holder is movable in the horizontal plane;
   a spherical core mounted in the sphere holder;
   a core holder for holding the spherical core fixed relative to the sphere holder;
   a second support for movably supporting the spherical core in the sphere holder when the core holder is released so that the spherical core can rotate with respect to the sphere holder;
   a sheath for holding the rotatable spindle of the machine tool and a driver for rotationally driving the rotatable spindle, wherein the sheath is slidably movable through a bore in the spherical core to position the rotatable spindle in working and retracted positions relative to a workpiece; and
   balancing masses mounted on the spherical core, wherein the balancing masses cause a combined center of gravity of at least the spherical core, the balancing masses, the sheath, the driver and the rotatable spindle to be located substantially along a central longitudinal axis of the rotatable spindle and adjacent a center of rotation of the spherical core when the spindle is in the working position.

2. The device according to claim 1, wherein the first support comprises a plurality of nozzles arranged in the pre-adjustment support, and wherein the plurality of nozzles are able to generate a fluid film of substantially uniform thickness between the sphere holder and the pre-adjustment support.

3. The device according to claim 2, further comprising a plurality of fluid flow adjustment members connected to respective ones of the plurality of nozzles, wherein the fluid flow adjustment members are adjustable to ensure that a fluid film between the sphere holder and the pre-adjustment support has a substantially uniform thickness.

4. The device according to claim 1, wherein the clamp comprises tubes arranged in the pre-adjustment support and connected to a vacuum source.

5. The device according to claim 1, wherein the sphere holder comprises a peripheral flange that supports the sphere holder on the pre-adjustment support, wherein the clamp comprises a plurality of actuators that are attached to the peripheral flange and the pre-adjustment support, and wherein the actuators are operable to clamp the sphere holder to the pre-adjustment support.

6. The device according to claim 5, wherein each of the plurality of actuators comprises:
   a body attached to the pre-adjustment support;
   a movable piston arranged in the body; and
   a rod attached to the piston, extending through a bore in the pre-adjustment support and attached to the peripheral flange of the sphere holder.

7. The device according to claim 1, wherein the core holder comprises:
   a lower spherical seat on the sphere holder configured to support a lower portion of the spherical core, and
   a holding piston that is movable between a holding position wherein the spherical core is clamped between the holding piston and the lower spherical seat and a released position wherein the spherical core is free to move with respect to the sphere holder.

8. The device according to claim 7, wherein the released position of the holding piston is defined by three adjustable stops mounted on a wall of the sphere holder 120° apart around a central axis of the sphere holder.

9. The device according to claim 1, wherein the driver is connected to a source of electricity by a flexible electrical cable attached to the sheath substantially along a longitudinal axis of the sheath.

10. The device according to claim 9, wherein the flexible electrical cable is wound in a helix and wherein the cable is also attached to a bracket mounted on the sphere holder.

11. The device according to claim 1, further comprising:
    a retractable wiper mounted on the sphere holder including a plurality of electrically conductive contacts; and
    a plurality of electrically conductive members mounted on the spherical core such that the conductive contacts are engagable with corresponding ones of the conductive members, and wherein the driver is connected to a source of electricity by the plurality of conductive contacts and the plurality of conductive members.

12. The device according to claim 11, further comprising:
    a plurality of electrically conductive strips mounted on an exterior of the sheath; and
    a plurality of electrically conductive pads mounted on the spherical core and engageable with respective ones of the conductive strips, wherein the plurality of conductive pads are connected to corresponding ones of the conductive members, and wherein the driver is connected to a source of electricity by the plurality of conductive strips and the plurality of conductive pads.

13. The device according to claim 11, wherein the retractable wiper is movable between an operating position wherein the conductive contacts are engaged with the conductive members, and a retracted position wherein the conductive contacts are not engaged with the conductive members.

14. The device according to claim 11, further comprising an actuator attached to the sphere holder, wherein the retractable wiper is mounted on a movable rod of the actuator.

15. The device according to claim 1, wherein the sphere holder is mounted on the pre-adjustment support such that a center of rotation of the spherical core is aligned with a plane of a top surface of the pre-adjustment support.

16. A device for aligning a longitudinal axis of a rotatable spindle of a machine tool with an axis of a cylindrical aperture, wherein a pilot rod attached to the spindle is used to align the spindle, the device comprising:

pre-adjustment support means for movably supporting the rotatable spindle on a bed of the machine tool, wherein the pre-adjustment support means are movable in a horizontal plane;

a spherical core;

sphere mounting means for mounting the spherical core on the pre-adjustment support means;

clamp means for clamping the sphere mounting means to the pre-adjustment support means;

core holding means for holding the spherical core fixed relative to the sphere mounting means;

first support means for movably supporting the sphere mounting means on the pre-adjustment support means when the clamp means is released such that the sphere mounting means is movable in the horizontal plane;

second support means for movably supporting the spherical core in the sphere mounting means when the core holding means is released so that the spherical core can rotate with respect to the sphere mounting means;

a sheath for holding the rotatable spindle of the machine tool and driving means for rotationally driving the rotatable spindle, wherein the sheath is slidably movable through a bore in the spherical core to position the rotatable spindle in working and retracted positions relative to a workpiece; and balancing masses mounted on the spherical core, wherein the balancing masses cause a combined center of gravity of at least the spherical core, the balancing masses, the sheath, the driving means and the rotatable spindle to be located substantially along a central longitudinal axis of the rotatable spindle and adjacent a center of rotation of the spherical core when the spindle is in the working position.

17. The device according to claim 16, wherein the first support means comprises a plurality of nozzles arranged in the pre-adjustment support means, and wherein the plurality of nozzles are able to generate a fluid film of substantially uniform thickness between the sphere mounting means and the pre-adjustment support means.

18. The device according to claim 17, further comprising a plurality of fluid flow adjustment members connected to respective ones of the plurality of nozzles, wherein the fluid flow adjustment members are adjustable to ensure that a fluid film between the sphere mounting means and the pre-adjustment support means has a substantially uniform thickness.

19. The device according to claim 16, wherein the clamp means comprises tubes arranged in the pre-adjustment support means and connected to a vacuum source.

20. The device according to claim 16, wherein the sphere mounting means comprises a peripheral flange that supports the sphere mounting means on the pre-adjustment support means, wherein the clamp means comprises a plurality of actuators that are attached to the peripheral flange and the pre-adjustment support means, and wherein the actuators are operable to clamp the sphere mounting means to the pre-adjustment support means.

21. The device according to claim 16, wherein the core holding means comprises:

a lower spherical seat on the sphere mounting means configured to support a lower portion of the spherical core, and a holding piston that is movable between a holding position wherein the spherical core is clamped between the holding piston and the lower spherical seat and a released position wherein the spherical core is free to move with respect to the sphere mounting means.

* * * * *

UNITED STATES PATENT AND TRADEMARK OFFICE
CERTIFICATE OF CORRECTION

PATENT NO. : 5,769,576

DATED : June 23, 1998

INVENTOR(S) : Gerard, et al

It is certified that error appears in the above-identified patent and that said Letters Patent is hereby corrected as shown below:

Title page, Item [60] Provisional application 60/000,175, June 13, 1995.

Column 1, line 3, before "Background" insert -- This nonprovisional application claims the benefit of U.S. Provisional Application No. 60/000,175, filed June 13, 1995.

Signed and Sealed this

Third Day of November, 1998

Attest:

Attesting Officer

BRUCE LEHMAN

Commissioner of Patents and Trademarks